E. W. SUMMERS.
ORE DOCK.
APPLICATION FILED JAN. 5, 1911.
1,232,119.
Patented July 3, 1917.
6 SHEETS—SHEET 6.
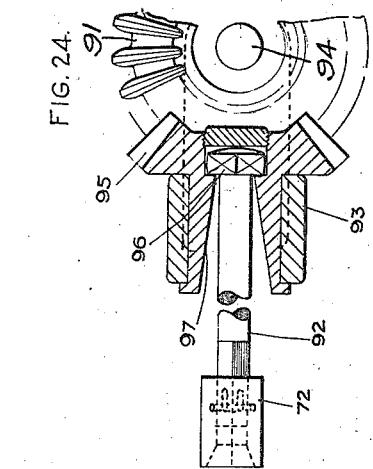
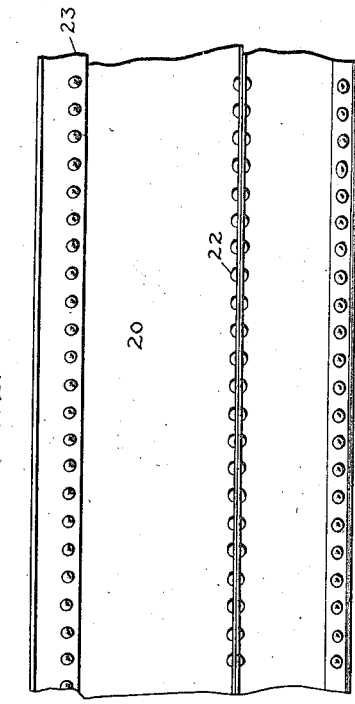
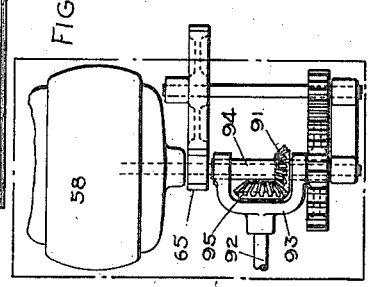
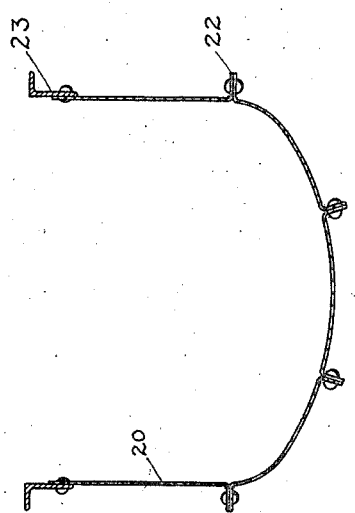
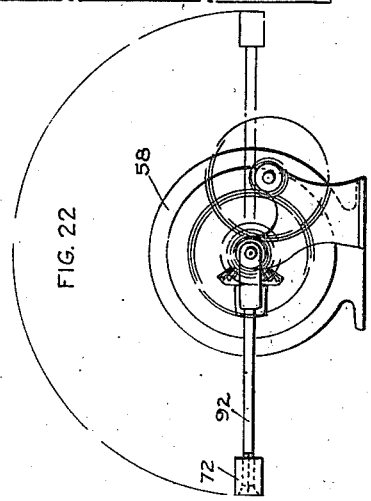
WITNESSES
INVENTOR

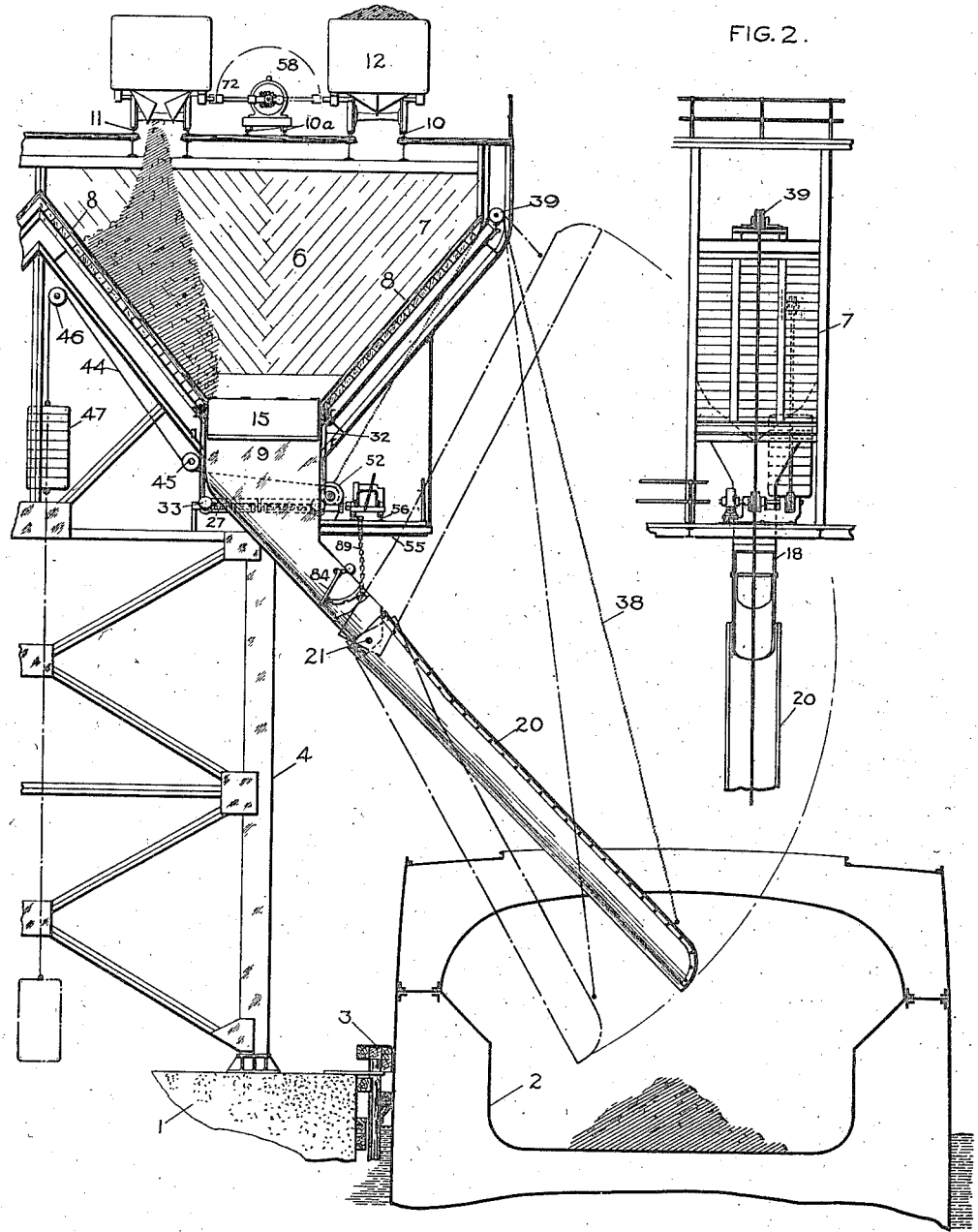

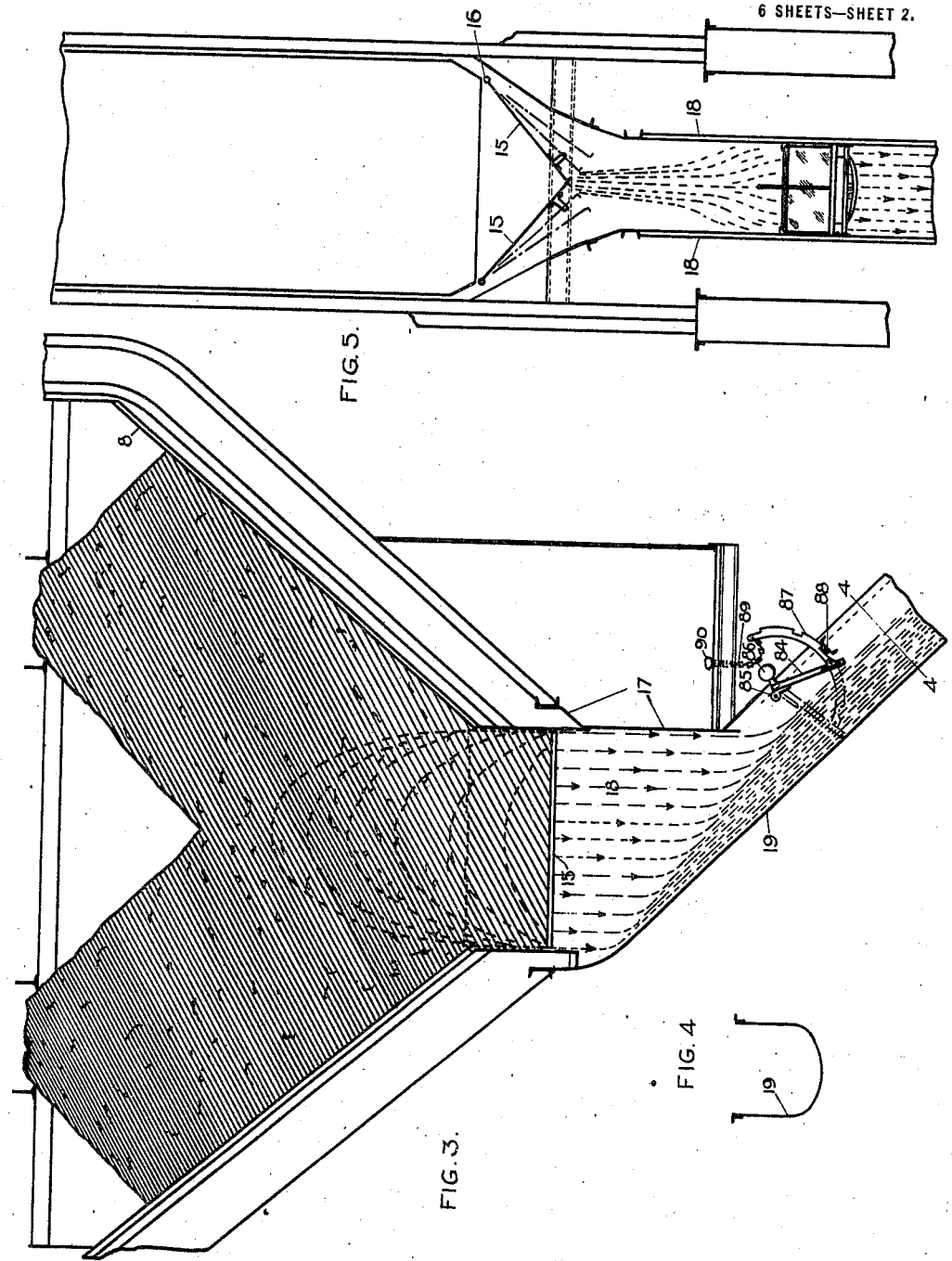

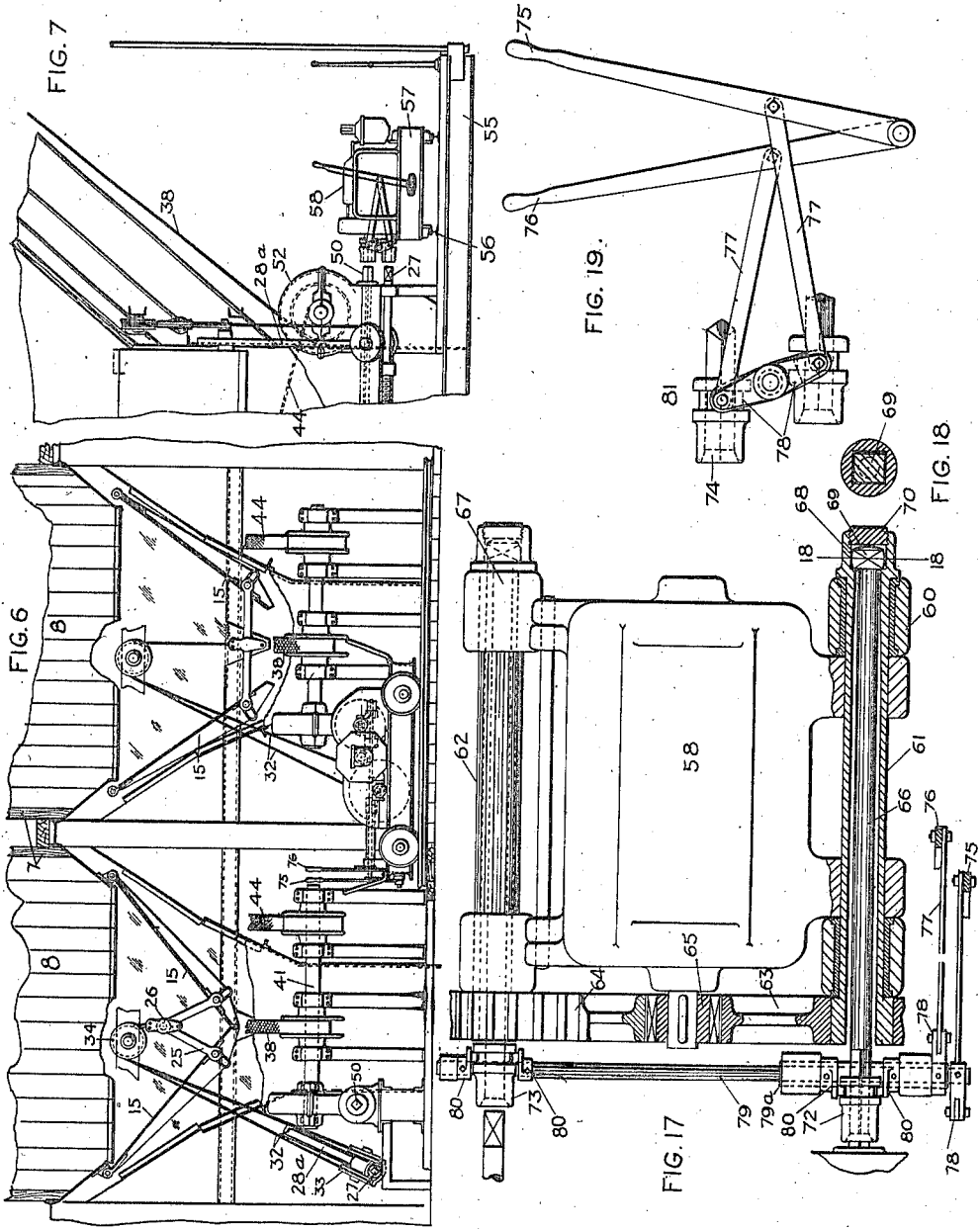

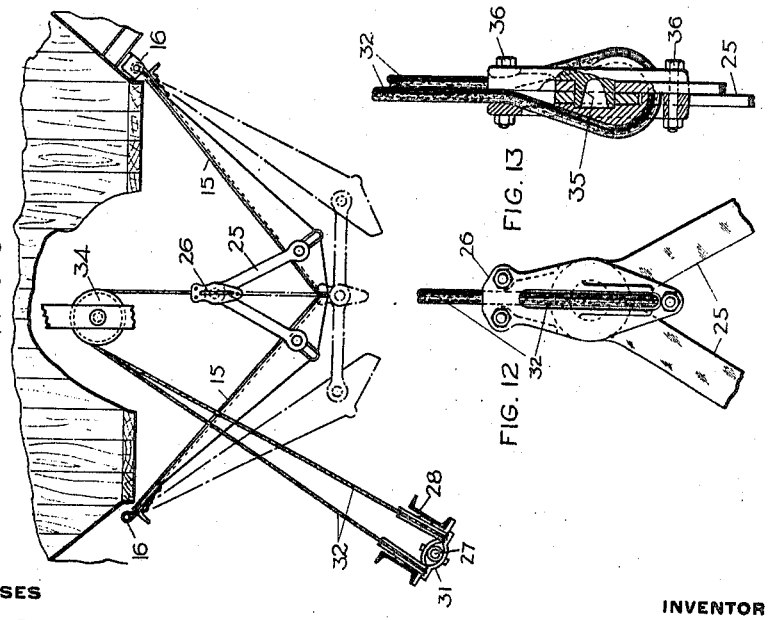

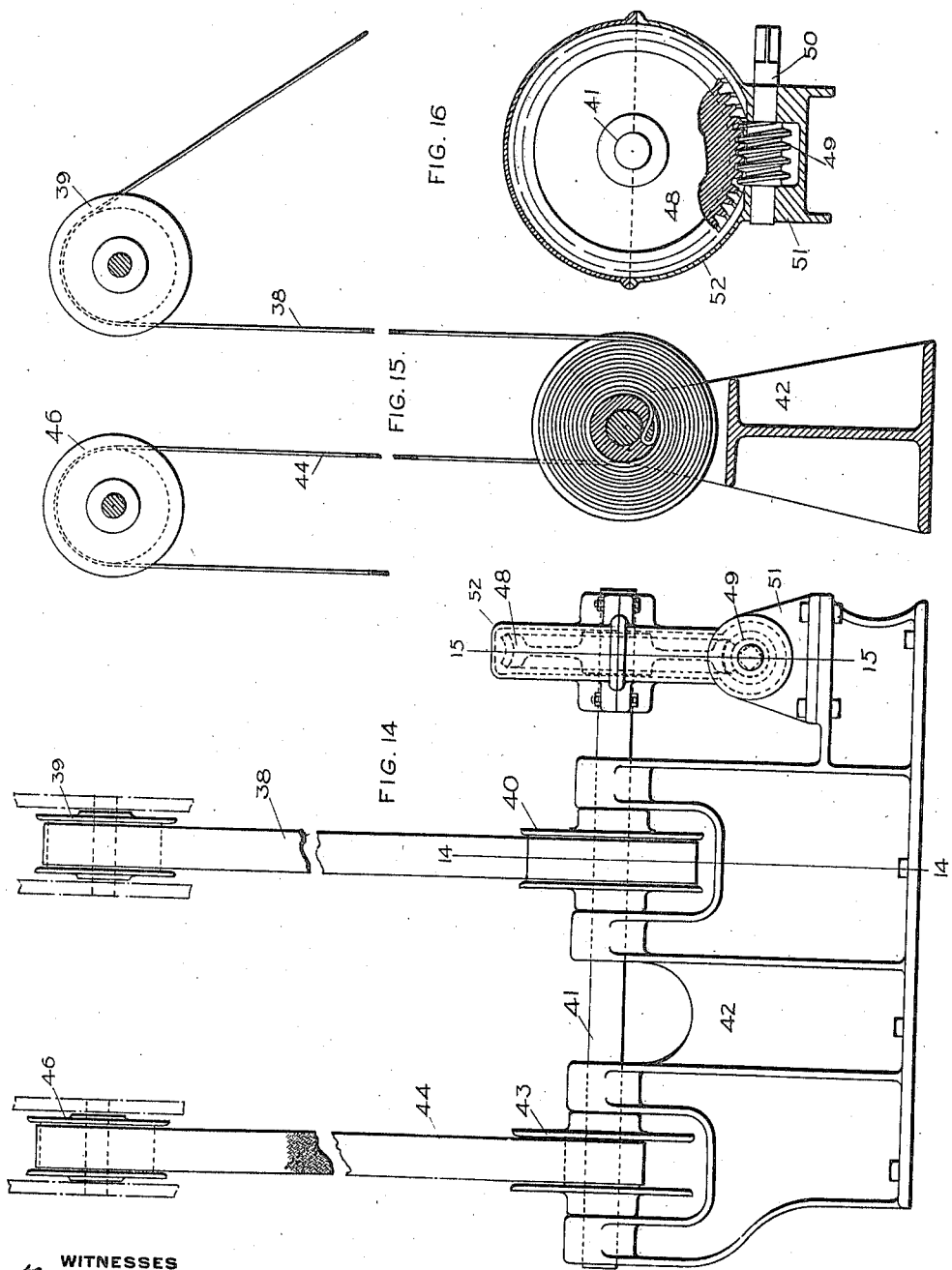

UNITED STATES PATENT OFFICE.

EDGAR W. SUMMERS, OF PITTSBURGH, PENNSYLVANIA.

ORE-DOCK.

1,232,119. Specification of Letters Patent. Patented July 3, 1917.

Application filed January 5, 1911. Serial No. 600,896.

*To all whom it may concern:*

Be it known that I, EDGAR W. SUMMERS, a resident of Pittsburgh, in the county of Allegheny and State of Pennsylvania, have invented a new and useful Improvement in Ore-Docks, of which the following is a specification.

This invention relates to docks, and particularly to docks for receiving ore and similar material and discharging the same into boats.

The object of the invention is to provide a dock for the purpose specified from which the ore or similar material can be loaded into boats much more expeditiously and in much less time than with such docks as heretofore constructed, and whereby the labor of loading the boats is very greatly reduced. As a result a single dock according to my invention is able to handle a much larger quantity of ore than docks as heretofore constructed, and the time of holding the boats in the harbor for loading is very materially reduced.

The invention comprises the construction, arrangement and combination of features hereinafter described and claimed.

In the accompanying drawings Figure 1 is a vertical section through one of the pockets or bins and a receiving boat, and showing the discharge chute in elevation; Fig. 2 is a side elevation of one of the pockets or bins; Fig. 3 is a vertical transverse section through one of the pockets or bins showing the disposition of the ore therein and the manner in which the same flows out of the same; Fig. 4 is a section taken on the line 4—4, Fig. 3; Fig. 5 is a diagrammatic view taken on a vertical longitudinal section through the bin or pocket illustrating the discharge of the material from the bin; Fig. 6 is a side elevation of two of the pockets or bins, the upper portions being in section, and illustrating the door and chute operating mechanism; Fig. 7 is an end view of a portion of a bin illustrating the door and chute operating mechanism; Fig. 8 is a detail view of the doors and their operating mechanism looking at the sides of the doors; Fig. 9 is a similar view showing the doors in end view; Figs. 10, 11, 12 and 13 are detail views of the door operating mechanism; Fig. 14 is a side elevation of the chute operating shaft and connecting ropes; Fig. 15 is a transverse section of the same on the line 15—15, Fig. 14; Fig. 16 is a transverse section on the line 16—16, Fig. 14; Fig. 17 is in part a plan view and in part a horizontal section showing the motor and connected shafts for actuating the door and chute operating mechanisms; Fig. 18 is a section on the line 18—18, Fig. 17; Fig. 19 is a diagrammatic view of the coupling sleeves and levers; Figs. 20 and 21, are respectively a cross section and side elevation of the discharge chute; Fig. 22 is in part a plan view and in part a horizontal section of a modified motor for actuating the door and chute mechanism; Fig. 23 is a plan view of the same; and Fig. 24 is a detail sectional view of the same.

My dock is adapted primarily for loading into boats iron ore, which when in a wet state is very sticky and frequently clogs in the discharge openings in dock pockets as heretofore constructed. As a consequence it has been found necessary to poke the ore by hand labor, which not only results in considerable expense, but in a tremendous loss of time. To obviate the necessity of such hand poking, and to insure the automatic flow of the ore from the pockets or bins to the boat, and to expedite the loading of the boats is the primary object of this invention.

The dock is provided with any suitable foundation 1 alongside the usual harbor slip for receiving the boats, one of which is shown in cross section at 2, in Fig. 1. The usual fenders or guards 3 are provided along the foundation of the dock against which the boat is tied. The frame or trestle work 4 of the dock may be of any suitable construction and design, preferably of steel. This trestle or frame serves to support the pockets or bins, the discharge chutes and the operating mechanism. The pockets or bins, indicated as an entirety by the reference numeral 6, are arranged in series along the dock as is the usual practice, and are adapted to receive the ore from cars run on tracks above said pockets or bins.

Heretofore these pockets or bins have had one side wall sloping and the other side wall vertical, with the discharge opening and door therefor in the lower portion of the vertical wall. In the improved bins the end walls 7 are vertical as is the usual practice, but both side walls 8 are inclined, preferably at the same angle, and converge toward each other downwardly. The discharge opening 9 for the ore is at the bottom of these converging sides. The angle of the side walls is slightly greater than the angle of repose of the material, so that the material does not lodge on the same, but slides down when support at the discharge opening is relieved.

Above the series of pockets are arranged two supply tracks 10 and 11 for the cars 12 which bring the ore from the mines. These tracks are so located that when the ore is discharged from the cars it falls onto the sloping side walls of the pocket, and not directly upon the doors which close the discharge opening. This is clearly shown in Fig. 1. When the pocket is full the material is disposed substantially as shown in Fig. 3, the lowest point of the top surface of the material being directly above the discharge opening. When the doors are opened the material immediately above drops down, and progressively breaks away from underneath in progressively increasing arches, somewhat in the manner indicated by the dotted lines on Fig. 3, said breaking away gradually extending upwardly toward the top surface of the mass of ore in the pocket. As soon as sufficient material has dropped away to weaken the remaining arch sufficiently the two masses of ore on the two opposite sloping walls slide toward each other, or toward the center of the pocket. These two masses are practically in the form of parallelepipeds moving toward each other and contacting at their upper corners. As a consequence the point of pressure is near the top surface of these masses, while farther down and particularly at the discharge opening the material is subjected to no pressure and is therefore loose so that it readily crumbles away and falls through the discharge opening. This arrangement prevents the ore from clogging at the discharge opening, as will be apparent. Furthermore, by having the two oppositely converging side walls the material discharged from cars on the two tracks meet each other at the center line of the pocket and expend their force one against the other, instead of battering against the door as is the case with the old style dock in which the discharge doors are in the vertical side wall of the pocket. The consequence is that the pocket is not as severely battered by discharging heavy material into the same as with prior constructions; and the clogging of the outlet opening is prevented by reason of so disposing the mass of material in the pocket that the area of pressure does not occur at or near the discharge opening, but at a point remote therefrom.

The discharge opening of each pocket is almost as wide as the distance between the vertical end walls of the pocket, as shown in Fig. 5. The doors 15 are preferably of the hinged type, although they may be of the bodily movable type, with their axes parallel to the end walls of the pocket, that is, transverse of the dock. The pivotal points of the doors are indicated at 16, said doors sloping downwardly and toward each other and meeting edge to edge. When released the lower edges of the doors swing away from each other, as indicated by dotted lines in Fig. 5, thereby removing the support for the entire area of the doors from underneath the mass of ore above the same, so that said mass immediately begins to move down, and begins to break away at the apex and drops through the opening between the doors even when the latter are only slightly open. By slowly opening the doors farther and farther the support for the mass which would otherwise be afforded by the doors is continually being withdrawn, so that the mass continues to move downwardly and discharge between the doors. These doors are of very considerable length transversely of the dock and provide a discharge opening which is long but comparatively narrow and through which a long narrow stream of ore discharges.

Underneath the doors is arranged a stationary chute section 17 of somewhat greater width than the maximum width of the discharge opening between the inner edges of the doors when they are fully open. This stationary chute section has substantially vertical side walls 18 and a sloping bottom 19 onto which the material falls. The axis of the chute is parallel to the longitudinal axis of the door opening, and as a consequence the ore falls down into the chute and moves down the same in a narrow stream, (Fig. 5) being deposited in the chute practically in successive layers one on top of the other, as indicated in dotted lines, Fig. 3. This has the effect of keeping the entire mass of discharging material moving away in a constantly moving narrow stream in a conduit which does not narrow and hence without chance of jamming or choking in any part of the chute. It also has the effect of thoroughly mixing the material; that is to say, if ore of one analysis is deposited in one side of the pocket, and ore of a different analysis deposited in the other side of the pocket, these run through the discharge opening between the doors and are laid in layers one upon the other on the moving narrow stream of ore.

The discharge chute is somewhat wider than the maximum width of the opening between the doors (Fig. 5) so that the stream has a chance to expand laterally. This discharge chute is of uniform cross section from end to end, so that there is no point of restricted cross section in which the material can clog.

The movable chute section is indicated at 20, being pivotally mounted at 21 at the end of the stationary chute section. The movable chute section is slightly wider than the stationary chute section so that its upper end fits outside of the lower end of the stationary chute section (Fig. 2). The movable chute section likewise is of uniform cross section from end to end so as not to offer any portion of restricted area in which the material can clog. It is entirely smooth from end to end, but as it must be made of rather heroic dimensions, about forty feet long and about four feet wide, it is not possible to make it from one sheet of metal. It must therefore be built up, and in order to obviate the use of cross joints or seams the sections of plate from which it is made run for the full length of the chute and are joined by longitudinal external joints. This is illustrated in Figs. 20 and 21, in which the joints are formed by riveting together outturned flanges 22 on the edges of the plates. The top edges of the chute are formed and strengthened by angle bars 23. As a consequence the joints run in the same direction as the flow of the material and offer no resistance to such flow, and for practical purposes the chute, although of very large size, has as smooth an interior as if formed from a single sheet of metal.

It will be readily gathered from the foregoing that the formation of the pocket or bin with opposite side walls sloping and converging toward each other, with the discharge opening at the bottom of said converging sides, and with the chute arranged with its axes parallel to the longitudinal axis of the door opening, provides an arrangement from which the ore is discharged entirely by gravity, without danger of clogging. As a consequence, the labor of poking and the delay caused by the clogging which has heretofore occurred is entirely obviated, and the pocket can be emptied in a very small fraction of the time which is necessary with the old arrangement of docks.

The mechanism for opening and closing the doors 15 is as follows:

To each end of each door is connected a link 25, the two links at the corresponding ends of a pair of doors being pivotally connected to a block 26. The actuating mechanism comprises a right and left hand screw 27 mounted in a suitable bearing member 28, held by brace 28ᵃ, and having working thereon two nuts 29 and 30, one of said nuts working on the right hand portion of the screw and the other on the left hand portion thereof, so that when the screw is rotated these nuts are simultaneously moved either toward or from each other. Pivoted to each nut is an equalizer or evener 31, to whose opposite ends are connected the two ends of a cable 32, which cables lead to the opposite ends of the doors, so that said doors are simultaneously lifted or lowered at both ends. The two reaches of each double cable pass over double guide sheaves 33, and thence upwardly and over similar guide sheaves 34 and thence through the blocks 26 which connect the ends of the links 25. The blocks 26 are so constructed that the cable passes through the same, so that there is no special fastening necessary at this point. Both ends of each cable, as stated, are connected to the equalizers on the nuts 29 and 30 respectively. The blocks 26 are each formed in two sections, one of which has integral therewith the pivot 35 to which the upper ends of links 25 are secured. The two sections of the blocks are connected by bolts 36.

It will be obvious from the illustration and foregoing description that when the screw 27 is rotated in one direction the nuts 29 and 30 move toward each other, thereby pulling on the double cables 32 and closing the doors 15; and when said screw is rotated in the opposite direction the nuts 29 and 30 move away from each other, thereby slacking the cables and permitting the doors to drop. The screw necessarily imparts a rather slow movement to the nuts 29 and 30, so that the opening movement of the doors is rather slow, which is to be desired, as there is a continuous withdrawal of the support offered by the doors to the mass of ore contained in the pocket, as hereinbefore described.

The mechanism for handling the movable chute section 20, as is necessary in order to discharge the ore at different points widthwise in the hatch of the boat, and for elevating the chute so that it is out of the way, comprises a cable or rope 38 which is attached near the outer end of the chute section and passes over a guide sheave 39 mounted near the upper portion of the dock and thence to a drum 40 on a power driven shaft 41 mounted in a suitable bearing frame 42. Also secured to the shaft 41 is the drum 43 on which is wound a cable or rope 44 which passes between adjacent stationary chute sections 17 and over guide sheaves 45 and 46 and has connected to its free end a counter weight 47. The members 38 and 44 preferably are flat ropes, as shown, although cables or chains of any character will answer the purpose. These ropes are wound upon their drums in opposite directions, so that as one of them unwinds the other winds up. As a consequence the counter weight 47 counterbalances to a large extent the movable chute section, and reduces the amount of power necessary to handle the same. The shaft 41 has secured thereto a worm wheel 48 which is engaged by a worm 49 on a shaft 50 mounted in a suitable bearing member 51. The worm and worm wheel are inclosed in a suitable case 52.

For operating the shaft 50 of the chute operating mechanisms and the screw 27 of the door operating mechanism, I provide the following means:

Each of these shafts is provided with a square or like end, which ends project transversely of the dock and lie in substantially the same horizontal plane, as shown in Fig. 6. Extending along the dock is a suitable gallery 55 upon which is a track 56 along which may be propelled a car 57 upon which is mounted a suitable motor 58, such as an electric motor. This car can be readily moved by hand from pocket to pocket, and the electric current can be supplied to the motor either by a suitable conductor located between the track and suitably protected, or by having a conductor concealed along the frame of the dock and provided with suitable sockets into which may be plugged a cord leading to the motor. As both schemes are perfectly obvious and well understood, they are not illustrated. Various forms of transmitting gearing may be used, one being as shown in Figs. 17, 18 and 19. Rotatably mounted in bearings 60 on the car 57 are a pair of hollow shafts or quills marked respectively 61 and 62. Keyed respectively to these quills are gear wheels 63 and 64 which mesh with a pinion 65 on the armature shaft of motor 58 so that the operation of the motor rotates both of the quills 61 and 62. Extending through these quills are solid shafts marked respectively 66 and 67, which have at their outer ends a driving connection with the quills but in a manner to permit the inner ends of the solid shafts to move slightly up, down and sidewise. The driving connection is made by providing the outer ends of the quills with square or other non-circular shaped sockets 68, and providing the outer ends of the solid shafts with heads 69 of similar cross sectional shape. These heads 69 longitudinally of the shafts are very slightly rounded so as to permit a slight rocking movement of the solid shafts, as heretofore stated. Plugs 70 close the ends of sockets 68 and prevent the escape of the solid shafts from the quills.

The free ends of the solid shafts are of square or other non-circular cross section, and slidably mounted thereon are coupling sleeves marked respectively 72 and 73, which are adapted to couple the square free ends of the shafts 66 and 67 to the square ends of screw worm shaft 27 and shaft 50, respectively. These coupling sleeves 72 and 73 have a bore conforming in shape to the square ends of the shafts which they are to couple, but longitudinally these bores are very slightly curved so as to compensate for the difference of angle between the coupled shafts, which is likely to occur as the track upon which the car moves may not be absolutely true so that the coupling shafts may be slightly out of alinement.

The coupling is made or broken by merely sliding the sleeves 72 and 73 lengthwise on the shafts 66 and 67. To facilitate the engagement of these sleeves with the shafts to which they are to be coupled the outer ends of said sleeves are bell-mouthed, as shown at 74. The sleeves are moved lengthwise on their shafts from levers 75 and 76, respectively, connected by links 77 to arms 78 on rocking shaft 79 and outer hollow sleeve or shaft 79ᵃ, respectively, and which are each provided with other arms 80, arranged in pairs and engaging annular grooves formed in the sleeves, much in the manner of moving a clutch by a forked clutch lever.

The car, with electric motor thereon, is pushed along the track by hand and stopped in such position that the shafts 66 and 67 are substantially in alinement respectively with the screw shaft 27 and the worm shaft 50. Then by operating one or the other of the levers 75 or 76 the respective shaft 66 or 67 is coupled to the desired operating shaft by longitudinal movement of the sleeve 72 or 73. As a consequence the doors and the chute are operated by power. The chute operating shaft will be controlled so as to deposit the ore at any desired point widthwise in the hatch of the boat in order to properly trim the boat. This control is effected entirely by lever 76 which couples and uncouples the shaft 67 from the worm shaft 50, as necessary to discharge the ore in the proper location in the hatch.

There also will be a suitable control for the motor provided on the car 57 so that the speed of the motor can be varied at will. The motor will also be provided with the usual automatic brake which becomes effective whenever the current supply to the motor is broken. These automatic brakes operating electrically are well understood in the art, particularly on elevator motors and the like, and hence are not illustrated or described.

In the stationary chute section 17 there is preferably provided a gate 84 pivoted at 85 near its upper edge and adapted to swing in the direction of flow of the material, as shown in Fig. 3. This gate is provided with a counter weight 86 to close the same. To the free end of the gate is pivoted a curved notched bar 87 adapted to have its notches engage a fixed stop 88 secured to the chute and therefore adapted to hold the gate in any one of several positions so that said gate will be open more or less as desired. To the upper end of the curved bar 87 is connected a chain 89 or similar member which extends up through the floor of the gallery 55 and is provided with a hand grip 90 by means of which the gate can be controlled.

This gate is designed to hold in the upper chute section a small quantity of material in case the doors for any reason cannot be closed or it is desired not to close the same.

Figs. 22, 23 and 24 illustrate a modification of the motor mechanism for operating the doors and chutes. As there illustrated the armature shaft of the motor 58 extends longitudinally instead of transversely of the car. The motor pinion, preferably on a countershaft running at a slower speed than the armature shaft, is indicated at 91, and is shown as a beveled pinion meshing with a similar pinion on the connecting shaft 92. The latter is rotatable in yoke 93, which in turn is pivotally mounted on the extension 94 of the motor shaft, so that the shaft 92 can be swung about the axis of the motor shaft. This coupling shaft 92 is provided with a coupling sleeve similar to the sleeve 72 shown in Fig. 17 for coupling to the door and chute operating shafts. A single coupling shaft 92 may be provided, or a plurality thereof. The shaft 92 is flexibly connected to its pinion 95, as shown in Fig. 24, by means of a square head 96 filling a corresponding recess in the pinion. The pinion has a sleeve 97 which is rotatable in the yoke 93.

The coupling shaft illustrated in Fig. 22 is capable of being swung to operate shafts on opposite sides of the motor shaft, as indicated in dotted lines in said figure. This adapts this motor not only for operating the doors and chutes of the dock pockets but also for operating the door mechanism of the cars 12. For the latter purpose a track 10ª extends along the top of the dock between the supply tracks 10 and 11, as shown in Fig. 1, so that the doors of the cars can be power operated from the motor illustrated, and which is shown of the same type as that illustrated in Fig. 22.

The construction and arrangement of the dock and the manner of using the same will be understood from the foregoing description in connection with the drawings. This dock not only very greatly reduces the amount of labor which is necessary in the operation of docks as heretofore constructed, but also reduces the liability of the ore clogging in the pockets and in the discharge chutes, and very greatly expedites the loading of the boats, thereby reducing the time that the boats must remain in the slip, and enabling a single dock to load a much larger number of boats than has been possible with prior dock construction.

The reduction of labor is due to two causes; first, the power mechanism for operating the doors and chutes so that a single man operates as many doors and chutes through the power mechanism described as several men with the old forms of operating mechanism for these parts; and, second, the almost entire absence of poking or loosening the material in the pockets or chutes. While the first cost of the dock may be slightly larger than with docks as heretofore constructed, yet, considering the capacity of the dock the first cost is very much less. The operating cost is certainly very much less than that of prior docks, and the saving in time for the boats is also a very important item.

The operator is located on the gallery 55 underneath the overhanging portions of the bins so that he is sheltered from the inclemency of the weather, and is in such position that he has full view of the hatchways of the boat into which the ore is being discharged and also of the door openings above. On account of the sheltered position of the operator, the operation of loading is not likely to cease on account of rain storms, as heretofore, and his unobstructed observation of both the hatchways and the doors enables him to regulate the stream of ore as required, to properly deposit the same in the boat, to trim the same, to cut off the supply at the proper time, and also to observe the outflow of the ore from the bin so that he can avoid threatened clogging by opening the doors slightly wider. The convenience of this operating position is in marked contrast to prior dock construction in which the operators who control the chute movement and poke the ore out are stationed above the dock and not in a position where they can see either the doors or the hatchways.

My dock will preferably be constructed in two parallel series of pockets side by side, with a slip on each side, as has been the practice heretofore, and which is indicated in Fig. 1 in which the broken away portion on the left hand side indicates a similar pocket to the one which is illustrated.

What I claim is:

1. In a dock, a pocket or bin having oppositely arranged sloping side walls with a discharge opening at the bottom of said walls, doors closing said opening and arranged to provide a long, narrow discharge opening whose long axis is transverse to the length of the dock, and a chute leading from underneath said doors with its axis parallel to the axis of the discharge opening.

2. In a dock, a pocket or bin having oppositely arranged sloping side walls with a discharge opening at the bottom of said converging sides, doors closing said opening and arranged when open to provide a long, narrow discharge opening whose long axis is transverse to the length of the dock, and a narrow chute of uniform cross section from end to end leading from underneath said doors with its axis parallel to the axis of said opening, and operating means for said doors arranged to positively hold said doors stationary in any desired position between full open and closed position, thereby to secure any desired width of discharge opening.

3. In a dock, a pocket or bin having oppositely arranged sloping side walls with a discharge opening at the bottom of said walls, doors closing said opening and arranged to provide a long, narrow discharge opening whose long axis is transverse to the length of the dock, and a chute having a stationary portion leading from underneath said doors to a point beneath one of said sloping side walls, with its axis parallel to the axis of the discharge opening and having its bottom sloping downwardly, whereby the material coming from the narrow discharge opening is deposited in layers in the moving stream of material in the chute.

4. In a dock, a pocket or bin having oppositely arranged sloping side walls with a discharge opening at the bottom of said walls, doors closing said opening and arranged when open to provide a long, narrow discharge opening whose long axis is transverse to the length of the dock, one of said sloping side walls overhanging the edge of the dock, a platform for the operator located beneath the overhanging portion of said bin, and a chute having a stationary portion leading from underneath said doors to a point beneath said platform and having its axis parallel to the long axis of said discharge opening.

5. In a dock, a pocket or bin provided with opposite side walls sloping downwardly and toward each other and having vertical end walls, the discharge opening being at the bottom of the converging side walls and substantially as long as the distance between the vertical end walls, and doors for said openings arranged with their axes parallel to the end walls and meeting at the center line of said discharge opening and opening away from each other.

In testimony whereof I have hereunto set my hand.

EDGAR W. SUMMERS.

Witnesses:
F. W. WINTER,
MARY E. CAHOON.